United States Patent
Cadet et al.

(10) Patent No.: US 7,724,407 B2
(45) Date of Patent: May 25, 2010

(54) HOLOGRAPHIC DISPLAY AND CONTROLS APPLIED TO GAS INSTALLATIONS

(75) Inventors: Olivier J. Cadet, Bear, DE (US); Thomas Parias, Croisy-sur-Seine (FR); Omar Germouni, Chicago, IL (US)

(73) Assignee: American Air Liquide, Inc., Fremont, CA (US)

( * ) Notice: Subject to any disclaimer, the term of this patent is extended or adjusted under 35 U.S.C. 154(b) by 509 days.

(21) Appl. No.: 11/614,903

(22) Filed: Dec. 21, 2006

(65) Prior Publication Data

US 2007/0183012 A1  Aug. 9, 2007

Related U.S. Application Data

(60) Provisional application No. 60/761,561, filed on Jan. 24, 2006.

(51) Int. Cl.
*G03H 1/00* (2006.01)
(52) U.S. Cl. .......................................................... 359/1
(58) Field of Classification Search ...................... 359/1, 359/115
See application file for complete search history.

(56) References Cited

U.S. PATENT DOCUMENTS

| 4,818,048 | A | 4/1989 | Moss |
| 5,103,325 | A * | 4/1992 | Andrews et al. ............... 359/23 |
| 6,377,238 | B1 | 4/2002 | McPheters |
| 7,150,531 | B2 * | 12/2006 | Toeppen ......................... 353/7 |
| 2005/0002074 | A1 * | 1/2005 | McPheters et al. ............. 359/15 |
| 2005/0128184 | A1 * | 6/2005 | McGreevy .................... 345/156 |
| 2006/0169771 | A1 * | 8/2006 | Brookner ...................... 235/382 |

FOREIGN PATENT DOCUMENTS

| GB | 2292711 | 11/1994 |
| WO | WO2005008378 | 1/2005 |

* cited by examiner

*Primary Examiner*—Alessandro Amari
(74) *Attorney, Agent, or Firm*—Donna Blalock Holguin

(57) ABSTRACT

The present invention provides methods and systems for holographic control and monitoring of processing devices. Operator control of a processing device is indicated by interaction with a holographic image. The holographic image is generated, and the operator interaction is detected, by a holographic control system. The holographic control system is sealed to prevent explosions, corrosion, and contamination resulting from contact with external substances.

26 Claims, 7 Drawing Sheets

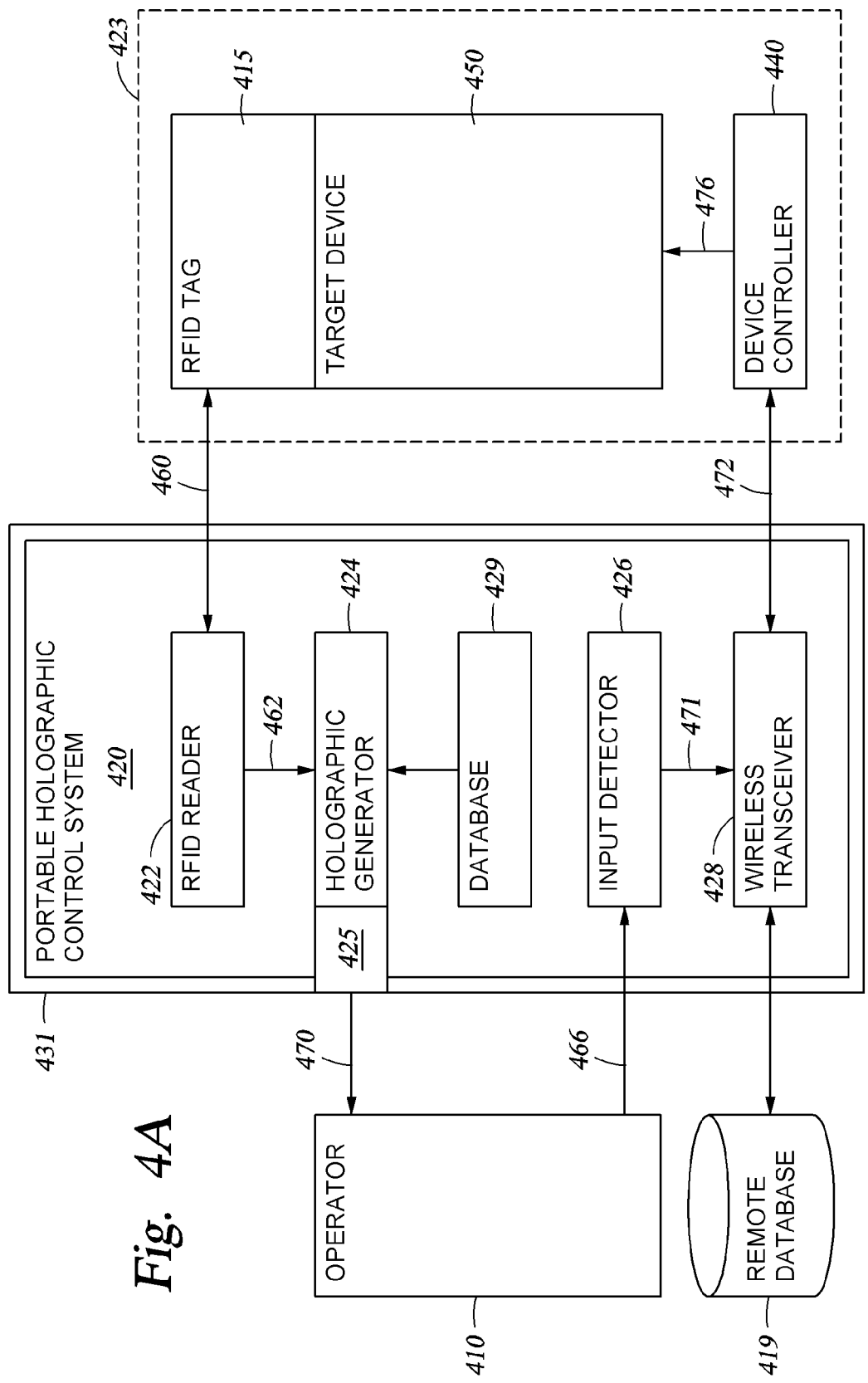

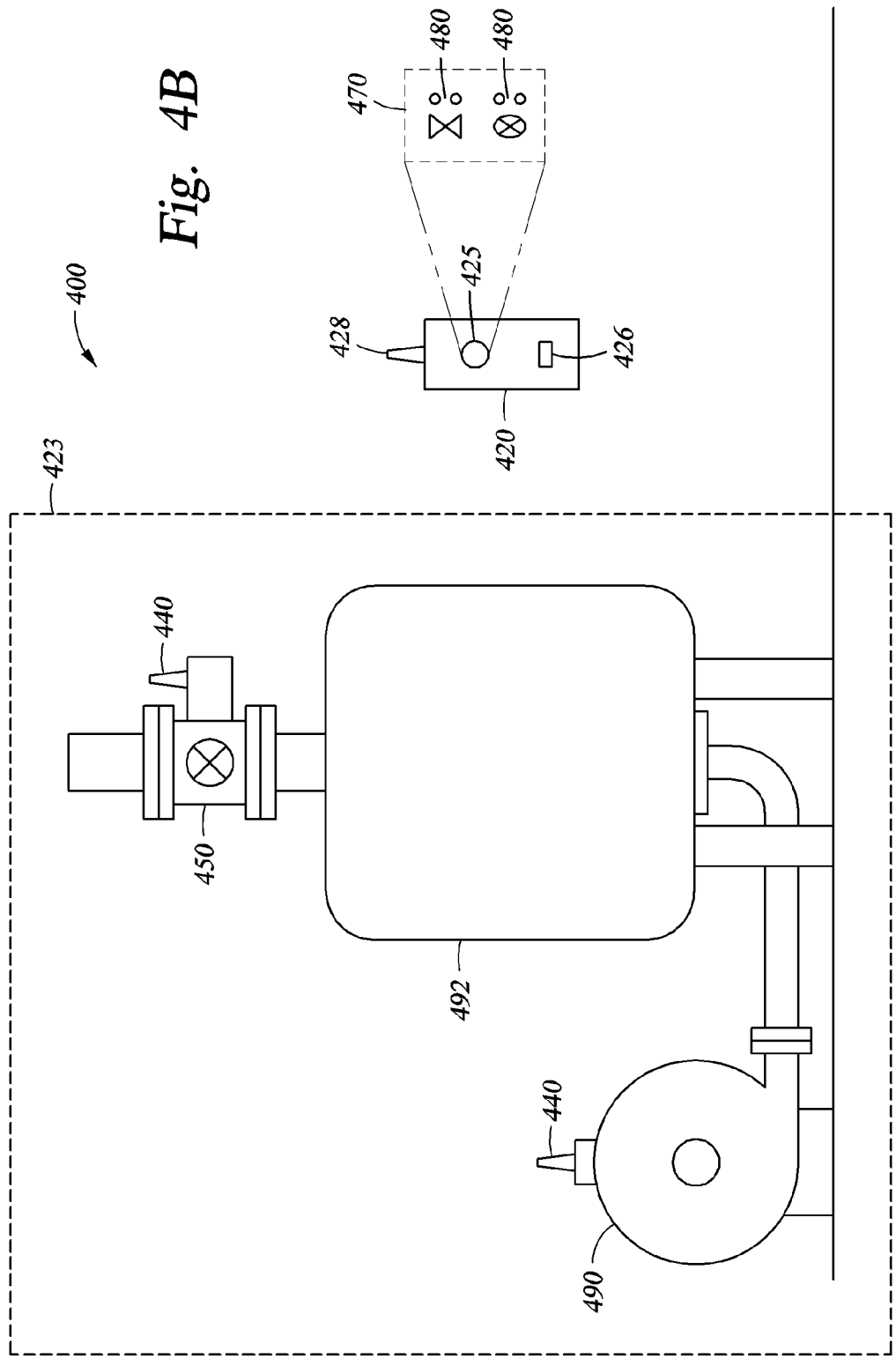

HOLOGRAPHIC DISPLAY AND CONTROLS APPLIED TO GAS INSTALLATIONS

CROSS-REFERENCE TO RELATED APPLICATIONS

This application claims benefit under 35 U.S.C. §119(e) to provisional application No. 60/761,561, filed Jan. 24, 2006, the entire contents of which are incorporated herein by reference.

BACKGROUND

Embodiments of the present invention relate generally to control systems and methods, and more specifically to a holographic interface for controlling and monitoring status of devices.

Most industrial processing facilities include multiple processing devices, with each type of device performing a specialized function. For example, such devices may include gas compressors, fluid pumps, boilers, and flow valves. In the area of industrial processing facilities, these devices may be referred to as field equipment.

Field equipment is often operated by the use of electronic control interfaces that may be adjusted by human operators. These electronic control interfaces may be referred to as Human-Machine Interfaces (HMIs.) A typical HMI may include a display indicator indicating which device is being controlled and the current state of the device. In addition, a typical HMI may include one or more electromechanical switches to control the device. One problem with electromechanical switches is that they have mechanical components that may become worn with repeated use. If the electromechanical switches fail, the operator may not be able to control the operation of processing devices, which may result in the failure of an entire processing unit or facility.

Since HMIs are connected electronically to the processing devices they control, they may be placed in locations remote from the controlled device. However, in many situations, the preferred location of the HMIs is one of close physical proximity to the controlled device. Locating the HMI close to the controlled device may enable the operator to determine the validity and effects of any control actions performed.

However, the environment of many processing facilities can create problems with the use of electronic HMIs that are located close to the field equipment. In some situations, explosive gases or liquids may be present in amounts sufficient that an electric spark can cause an explosion. In such situations, the electromechanical switches included in typical HMIs may create sparks that cause an explosion.

In other situations, the field equipment may be exposed to contaminants in the surrounding environment, such as water, abrasive dust, grease, or corrosive materials. If the HMIs are located close to the field equipment, they may be exposed as well. This exposure may result in failure of the HMIs, and possibly lead to the failure of the controlled devices as well.

To mitigate the issues related to the danger of explosions and contamination, the HMIs may be enclosed in sealed or explosion-proof cabinets. However, the use of sealed or protective cabinets does not completely solve the above-described problems. In order to use some HMIs, an operator may need to open the cabinet, thus allowing the surrounding environment to enter the cabinet. In such situations, there is a possibility of an explosion or of contamination of the HMI. Further, it may not be practical or feasible to locate an HMI in close proximity to some field equipment. Some processing facilities may not have sufficient space available to allow a HMI cabinet next to each piece of field equipment. Also, providing a HMI cabinet for each piece of field equipment may be prohibitively expensive.

As the foregoing illustrates, there is a need in the art for an improved technique of providing an HMI to control processing equipment.

SUMMARY

One embodiment of the invention provides a system, the system including a holographic generator configured to display holographic controls for one or more devices of a processing facility, an input detector configured to receive user input indicative of user interaction with the holographic controls, and control circuitry configured to issue control signal responsive to the user input, wherein the control signals operate the one or more devices of the processing facility.

Another embodiment of the invention provides a system, the system including a device in a processing facility, a device controller configured to control the device, a stationary wireless communication module in communication the device controller, and a portable control device. The portable control device includes a holographic generator configured to display holographic controls for the device, an input detector configured to receive user input indicative of user interaction with the holographic controls, and a wireless communication module configured to issue control signals to the wireless communication module responsive to the user input, wherein the control signals cause the device controller to operate the device.

Another embodiment of the invention provides a method for providing a holographic control interface. The method generally includes generating the holographic control interface, wherein the holographic control interface includes one or more holographic controls for at least one device of a processing facility. The method generally further includes detecting an operator interaction with the one or more holographic controls, and issuing one or more control signals responsive to the detected operator interaction, the control signal configured to operate the at least one device.

Another embodiment of the invention provides a system, the system including a holographic generator configured to display holographic controls for one or more devices of a processing facility, an input detector configured to receive user input indicative of user interaction with the holographic controls, control circuitry configured to issue control signal responsive to the user input, wherein the control signals operate the one or more devices of the processing facility, a proximity sensor to activate the holographic generator when an operator wearing a radio-activated tag is within a predetermined operating range of the proximity sensor; and a housing enclosing the holographic generator in order to seal the holographic generator from the ambient environment.

BRIEF DESCRIPTION OF THE DRAWINGS

FIGS. 4A-B illustrate a holographic control system configured in a portable device, according to one embodiment of the invention.

DESCRIPTION OF PREFERRED EMBODIMENTS

Figure 1:
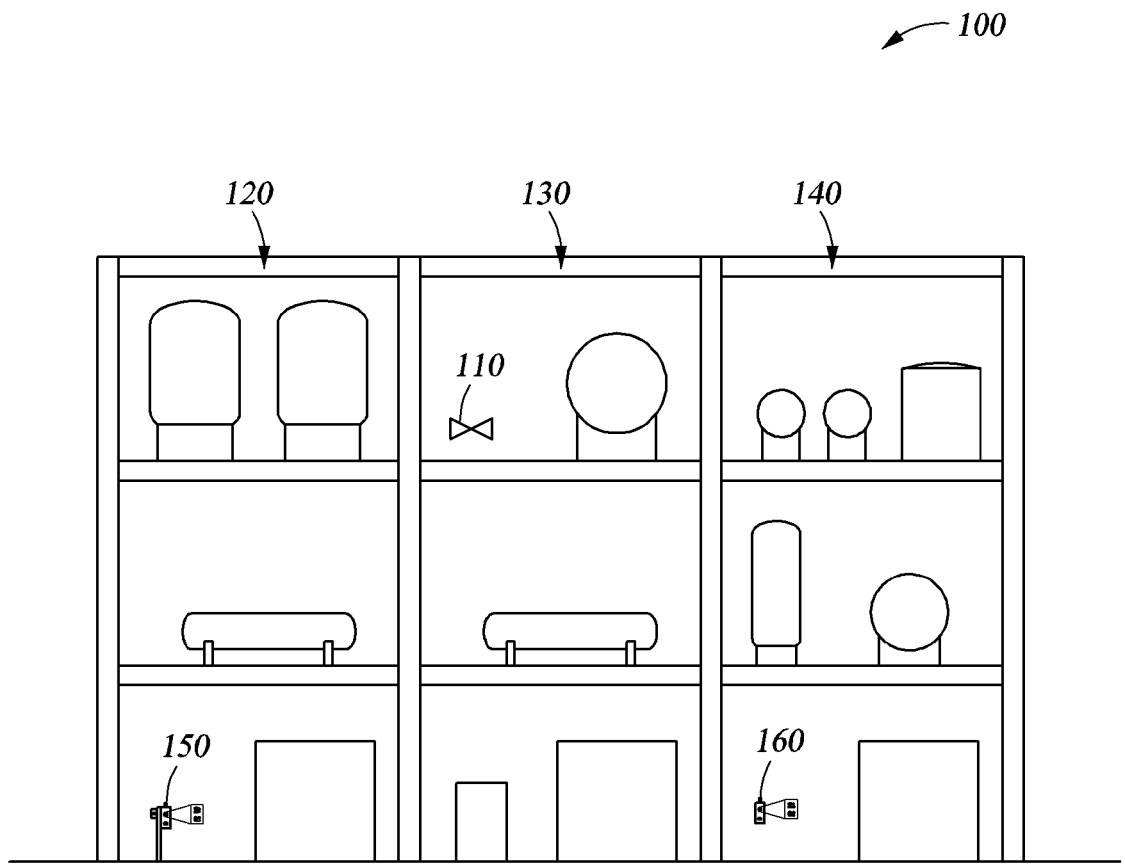
FIG. 1 illustrates an example of a typical industrial processing environment.

Embodiments of the present invention generally provide projected, e.g., holographic, control interfaces for processing equipment.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the system shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is composed of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates an example of a typical industrial processing environment. As shown, the exemplary processing environment 100 includes multiple processing devices, for example inlet valve 110. This exemplary environment includes some common problems for controls of the prior art. For example, as seen in area 120, a processing environment can often be crowded, and thus make it difficult to mount standard control enclosures. In some situations, the physical shape and form of the processing devices may also make it difficult to properly mount control enclosures.

As another example, area 130 illustrates the problem of a hazardous environment due to the presence of explosive gases or liquids. Area 140 illustrates the problem of a wet environment, which can lead to corrosion of electronic controls. Additionally, the presence of water may lead to electric shocks to operators touching electromechanical controls.

To address the issues posed by the processing environment 100, embodiments of the present invention provide for a holographic control interface, which allows a user to interact with control features of the interface, thereby controlling components of the processing environment 100. Since the holographic control interface has no mechanical or electrical components, the risks related to explosions or damage of control equipment may be mitigated.

In one embodiment, the holographic control interface can be generated from a holographic control system remotely located from the areas where control equipment may pose dangers or other risks to human operators or the control equipment. Further, as shown in FIG. 1, a holographic control system 150 may be fixed in a stationary mounting in proximity to a processing device. Alternatively, a holographic control system 160 may be built into a portable device that can establish a wireless connection to a processing device.

In one embodiment, the control system may include a holographic generator. As is known in the art, a hologram is a photographic record of the interference pattern formed by two light beams, a reference beam directed toward the photographic film and an object beam reflected from the object to be shown in the hologram. A hologram produces an image that can illusorily appear to a viewer as an object that occupies a region of three-dimensional space.

Holographic images are not physical objects, so any interactions with the holographic images are not subject to physical effects such as abrasion, corrosion, or electrical arcing. A holographic generator may include a sealed housing which protects its components (i.e., light source, photographic film, electrical components,) but which allows an operator to view a holographic image through an optical aperture (e.g., a glass lens.) Accordingly, one embodiment of the present invention provides for holographic controls in industrial processing environments. Since the holographic controls are not subject to physical effects that can cause problems, their use may provide advantages in terms of safety and reliability. Embodiments of holographic projection systems are described below.

Holographic Control System

Figure 2:
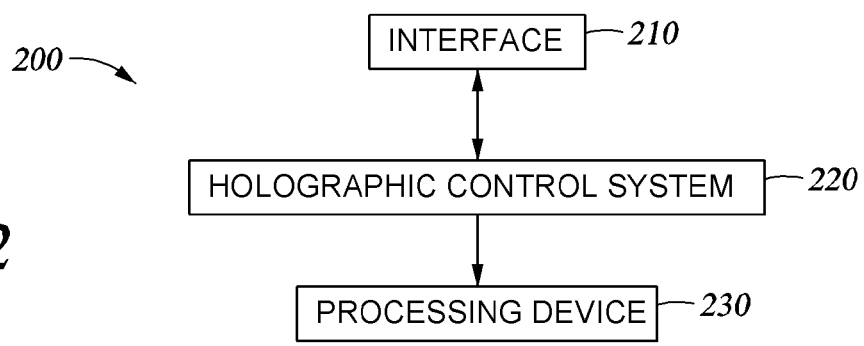
FIG. 2 illustrates a system diagram of a holographic control system for processing equipment, according to one embodiment of the invention.

FIG. 2 illustrates a system diagram of a holographic control system for processing equipment, according to one embodiment of the invention. As shown, system 200 includes an interface 210, a holographic control system 220, and a device 230. The device 230 may be one of a plurality of devices of, e.g., the industrial processing environment of FIG. 1.

The holographic control system 220 may be configured to control the device 230. The holographic control system 220 may be fixed to a stationary mounting (i.e., stationary system 150 of FIG. 1,) or may be built into a portable device that can establish a wireless connection to a processing device (i.e., portable device 160 of FIG. 1.) In the situation where there is a plurality of devices available, the holographic control system 220 may allow the selection of a specific device 230 to be controlled. The selection of a device may be accomplished by user specification, by wireless connection, or by other means. In one embodiment, the holographic control system 220 is also configured to provide the interface 210.

The interface 210 may be configured to display information received from the holographic control system 220, as well as to transmit any user input to the holographic control system 220. By viewing the interface 210, an operator can determine which processing device 230 is being controlled. Further, the interface 210 could present a set of user-selectable holographic controls for the processing device 230. By selecting one of the holographic controls from the interface 210, an operator may cause the corresponding control action to take place in the processing device 230. Furthermore, it is contemplated that the holographic control system 220 could provide feedback to the operator by way of the interface 210. The feedback may enable the operator to determine the results from any control action taken.

Holographic Control System Fixed in a Stationary Mounting

In one embodiment, a holographic generator is fixed in a stationary mounting in proximity to a processing device, and displays a holographic image of device controls and status monitoring. The operator is able to interact with the holographic image to control the corresponding processing device. Additionally, a single stationary holographic generator may be configured to control multiple processing devices. The operator is also able to verify status of equipment and to have access to documentation on the processing device.

Figure 3A:
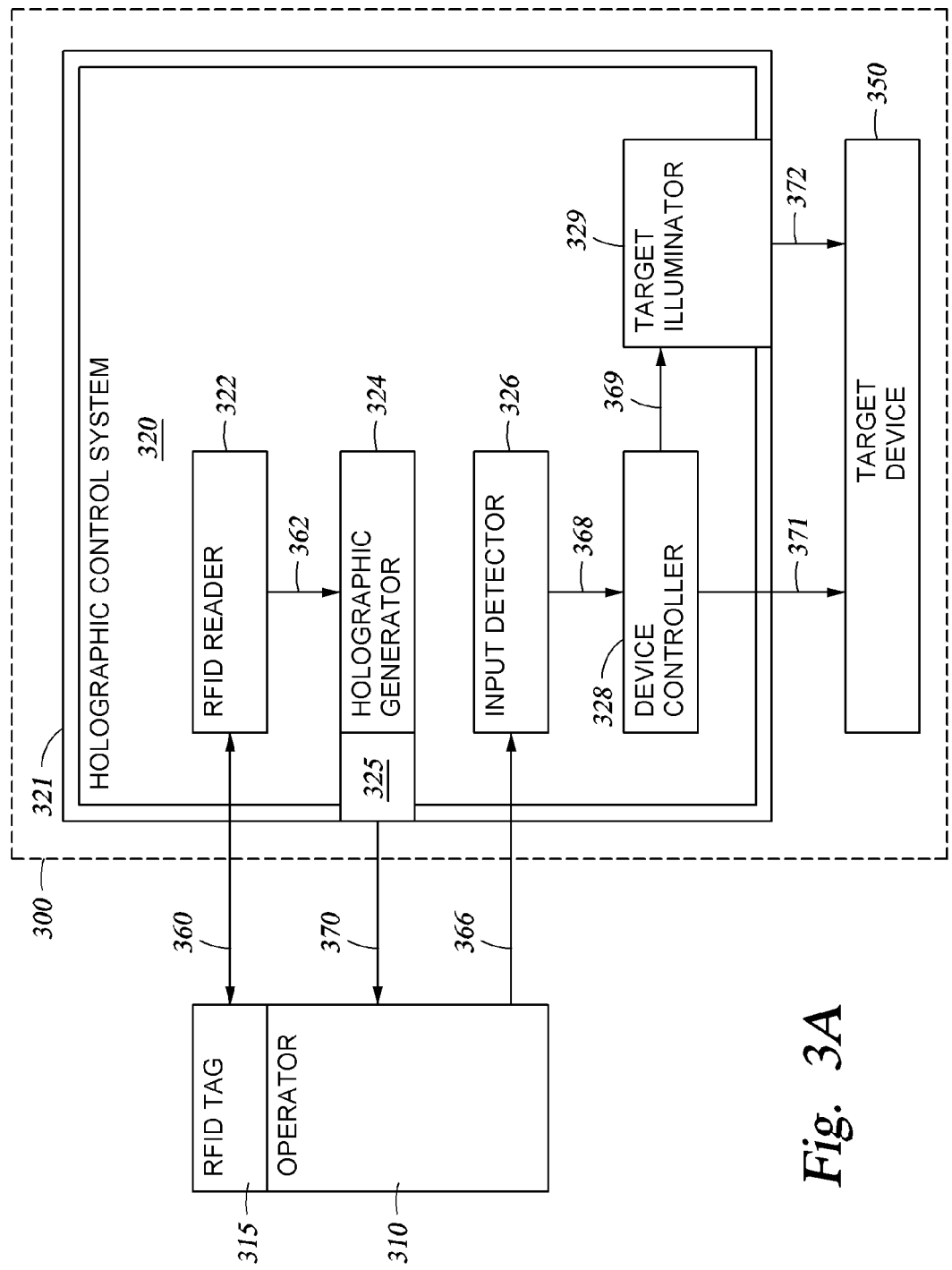
FIGS. 3A-B illustrate a holographic control system fixed in a stationary mounting, according to one embodiment of the invention.
Figure 3B:
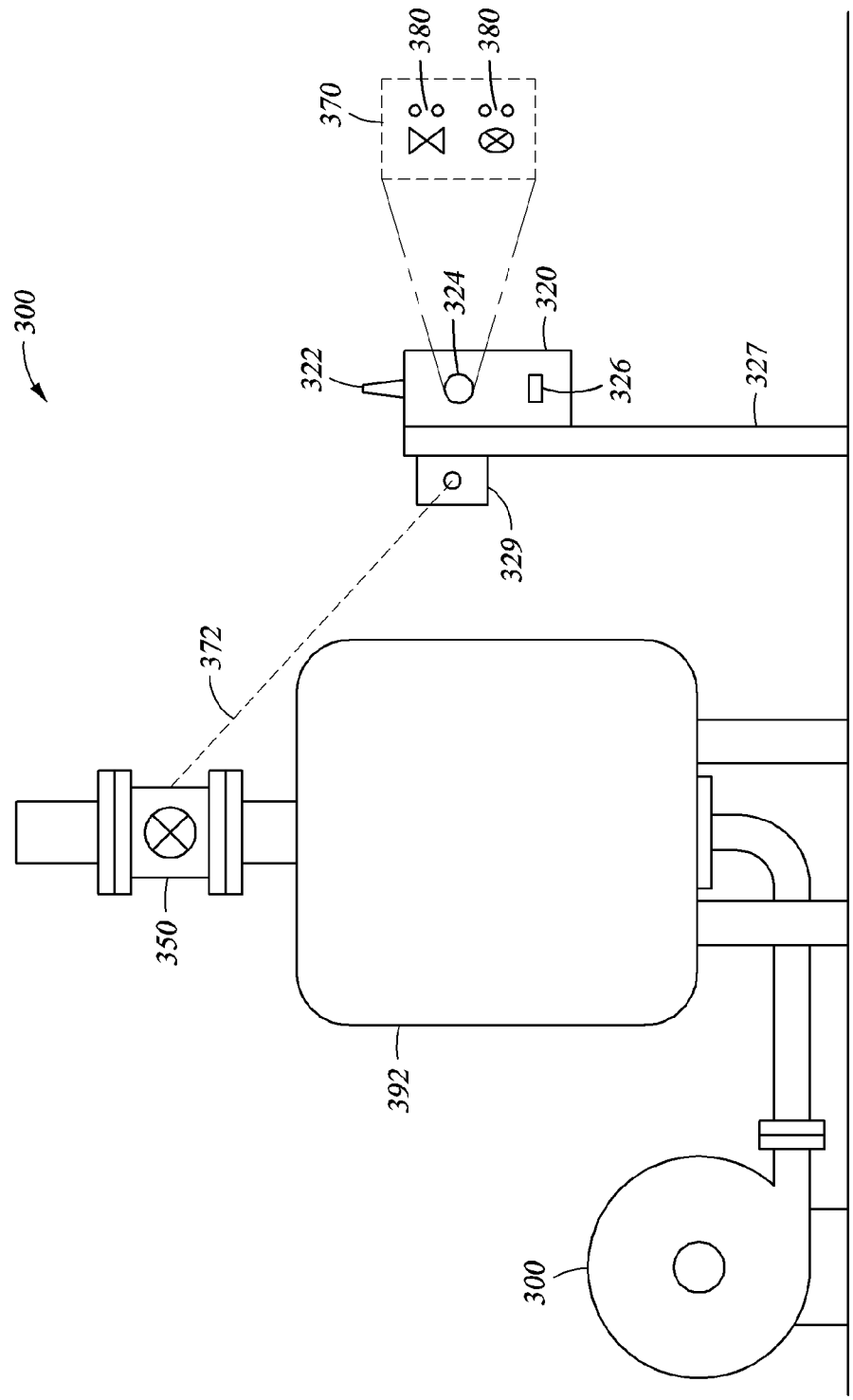

FIGS. 3A-B illustrate a holographic control system fixed in a stationary mounting, according to one embodiment of the invention. As shown in FIG. 3A, a system 300 includes a holographic control system 320 and a target device 350. Holographic control system 320 includes a RFID reader 322, a holographic generator 324, an optical aperture 325, an input detector 326, a device controller 328, a target illuminator 329, and a sealed housing 321. The holographic control system 320 is attached to a rigid mounting member (not shown), and is thus fixed in place at a particular location in the industrial processing facility (e.g., location 140 of FIG. 1.) Holographic control system 320 is electronically connected to the target device 350. That is, target device 350 is the processing device being controlled by the holographic control system.

The holographic control system 320 enables operator 310 to interact with target device 350. As such, the holographic control system 320 serves as a Human-Machine Interface (HMI) to any processing devices configured to respond to the holographic control system 320.

In this embodiment, the holographic control system 320 is activated when operator 310 moves within a pre-determined range of the target device 350. When this occurs, the RFID reader 322 is able to establish a RFID connection 360 with the RFID tag 315 carried by the operator 310. Once a RFID connection 360 is established, the holographic generator 324 is activated by an activation signal 362. It is contemplated that the holographic control system 320 may be activated by other means, including motion sensors, electric switches, magnetic cards, and the like.

Once activated, the holographic generator 324 generates a holographic image 370 through the optical aperture 325. The holographic image 370 results in an illusory image of a three-dimensional object. The holographic image 370 includes a set of visual control elements that, when viewed by the operator 310, appear to be located in a space fixed in between the operator 310 and the holographic generator 324. In one embodiment, the apparent size and location of the holographic image 370 may be adjusted to the preference of the operator 310.

Each visual control element, or holographic control, of the holographic image 370 represents a specific control action for the target device 350. Some examples of such control actions are activating a pump, closing a valve, activating a cooling fan, or adjusting a thermostatic temperature control. Thus, the holographic image 370 provides the operator 310 with a holographic control system that allows the operator 310 to manipulate one or more target devices by interacting with the visual control elements of the holographic image 370. The visual control elements may include, for example, icons, menus, toolbars, etc.

In one embodiment, the holographic control system 320 includes a sealed housing 321 to prevent exposing the internal components to any external substances. The sealed housing 321 may be required because, in some situations, there may be explosive gases or liquids present in the surrounding environment. If the holographic control system 320 is not sealed from such explosives, the internal components may cause an electrical spark or thermal condition that may trigger an explosion. Further, there may be substances present in the surrounding environment that are corrosive or that may result in electrical short-circuits. Such events may cause the holographic control system 320 to fail, and could thus cause the connected processing equipment to fail as well. In this embodiment, the holographic control system 320 may provide an advantage by enabling an HMI that does not require direct interaction with physical components. Since the holographic generator 324 can project an image through the optical aperture 325, the integrity of the sealed housing may be maintained. In another embodiment, the risks related to explosions or equipment damage by exposure may be mitigated by positioning the holographic control system 320 sufficiently far away from the hazardous/contaminated areas. In this case, the sealed housing 321 may not be necessary.

To execute a control action, the operator 310 provides a user input 366 to the holographic control system 320 by passing a finger or hand through the holographic control of the holographic image 370 which corresponds to the desired control action. Alternatively, the user input 366 may be performed by other input methods known in the art. For example, it is contemplated that the operator 310 may interact with the control elements of the holographic image 370 by using a laser pointer or other pointing device.

The input detector 326 is configured to detect the location on the holographic image 370 that is being indicated by the operator 310. The input detector 326 may incorporate one or more of the techniques known in the art for detecting operator indications, such as optical detection, laser scanning, infrared ranging, or ultrasound ranging. The input detector 326 uses the location of the operator indication (e.g., the location of the operator's finger) to determine which particular holographic control in the holographic image 370 is being selected by the operator 310.

Input detector 326 sends a selection signal 368 to a device controller 328 to communicate which holographic control is selected. Some techniques for using holographs for control inputs are described by U.S. Pat. No. 6,377,238 issued Apr. 23, 2002 to R. McPheters, which is hereby incorporated by reference in its entirety.

In this embodiment, the device controller 328 interprets the selection signal 368 to determine the appropriate control action, and sends a control signal 370 to the target device 350. In response, the target device 350 performs the corresponding action. For example, a control signal 370 sent to a target device 350 that is an inlet valve may cause the valve to close.

In one embodiment, the device controller 328 also sends an identification signal 369 to the target illuminator 329. The identification signal 369 identifies the target device 350. The target illuminator 329 is a light source configured to generate an illumination 372 to visually identify the target device 350 from the one or more processing devices in the locality of the holographic control system 320. Thus, the illumination 372 serves to provide visible confirmation to the operator 310 that the holographic control system 320 is connected to and controlling the proper device. Thus, in one embodiment, the operator may first select a device to operate from the holographic image 370, e.g., from a device list displayed on the projected holographic image 370. The operator selection causes the target illuminator 329 to illuminate the selected target device 350. The operator 310 may then select a control action with respect to the target device 350.

In one embodiment, the target illuminator 329 may include a single emitter actuated by servo motors to orient the light toward the selected target device 350. Alternatively, the target illuminator 329 may include an array of light sources that are fixedly oriented toward respective target devices 350 in the proximity of the holographic control system 320. In various embodiments, the target illuminator 329 may include either incoherent light or coherent light (i.e., laser) sources.

FIG. 3B illustrates an example of a holographic control system fixed in a stationary mounting, according to one embodiment of the invention. In this example, a holographic control system 320 is fixed to a rigid mounting 327. The holographic control system 320 generates a holographic image 370 configured to control processing equipment which includes a control valve 310, a pressure vessel 312, and a pump 315. Although shown proximate to the processing equipment, the holographic control system 320 could in fact be substantially distant from the processing equipment, so long as the holographic image 370 is viewable by the operator. In this way, the operator may be close to the processing equipment and able to control the processing equipment, while the holographic control system 320 poses not threat of sparks and may be sufficiently distant from sources of contamination. In this embodiment, the holographic control system 320 is connected to the various processing devices by control mechanisms known in the art, for example electrical or optical connectors, electrical motors and actuators, and the like. Thus, the holographic control system 320 is configured so that it can serve as a HMI to the connected processing devices.

The holographic control system 320 includes a sealed housing (not shown) in order to seal out substances from the surrounding environment. As shown, the holographic control system 320 includes a target illuminator 329 to illuminate the target device that is being controlled. In this example, the target illuminator 329 is emitting a laser target illumination 372, which enables the operator to visually confirm that the target device is the control valve 350.

In this illustration, the holographic generator 324 is shown projecting a holographic image 370, which includes various holographic controls 380. An operator of the holographic control system 320 perceives the holographic image 370 as fixed in a space in between the operator and the holographic generator 324. An operator may initiate a control action by indicating a specific holographic control of the holographic controls 380. The operator performs an indication by putting his finger or hand in the space in which the desired holographic control appears to exist. The operator indication is detected by the input detector 326. The input detector 326 is configured to determine the holographic control selected by the operator based on the spatial coordinates of the operator indication. The control action selected by the operator is communicated to the target device (e.g., control valve 310), which carries out the control action.

Portable Holographic Control System

In another embodiment, a holographic generator is built into a portable device that can establish a wireless connection to a processing device. The operator is able to interact with the holographic controls to control the connected processing device. The portable device may be configured to connect to one of multiple processing devices.

FIG. 4A illustrates a system diagram of holographic control system configured in a portable device, according to one embodiment of the invention. As shown a portable holographic control system ("portable system") 420 includes a RFID reader 422, a holographic generator 424, an optical aperture 425, an input detector 426, a database 429, and a wireless transceiver 428. Also shown are an operator 410, a remote database 419, and the stationary components 423, which include a RFID tag 415, a device controller 440, and a target device 450. The target device 450 is the processing device being controlled by the portable holographic control system 420.

In this embodiment, the portable system 420 serves as an HMI to processing equipment configured for wireless control. The portable system 420 may be sized for mobile use by a human operator, and may be configured to be carried by a belt attachment, in a backpack, or by other means.

The portable system 420 enables the operator 410 to select a target device 450 from the available multiple processing devices in the surrounding locality. The identification of available processing devices may be performed by wireless technologies known in the art. In one embodiment, the available devices are identified by using an RFID reader 422 to establish RFID connections 460 with the RFID tags 415 attached to processing devices. Alternatively, the identification of available devices may be accomplished by other wireless technologies, such Bluetooth or WiFi. Further, it is also contemplated that the selection of target devices may be accomplished by non-wireless means, such as magnetic strips or bar code technology.

Once a target device is selected, the portable system 420 selects an appropriate control interface to project. That is, the control interface is selected according to the particular target device that is selected. To this end, the portable system 420 may include an interface manager configured to select the appropriate interface from a database 429 of control interfaces. Alternatively, the control interface may be retrieved wirelessly from a remote database 419 by the provision of a wireless transceiver 428. In one embodiment, the portable system 420 may connect to the target device 450 by a wireless connection via the wireless transceiver 428, and may enable the operator 410 to control the target device 450. The operator 410 may then be presented with a holographic image 470, which appears as a set of visual icons fixed in a space in between the operator and the holographic generator 424. Each visual control element, or holographic control, of the holographic image 470 represents a specific control action for the target device 450.

In one embodiment, the apparent size and location of the holographic image 470 may be adjusted to the preference of the operator 410. Further, the portable system 420 may be configured to enable the operator 410 to interact with the holographic interface 470 from a specified distance. The operator 410 may position the portable system 420 at a fixed location within the specified distance from the target device 450, and then approach the target device 450. The fixed location of the portable system 420 may be predefined to suit the particular layout of the industrial processing facility. In this case, the operator 410 may be able to control the target device 450 while in proximity to it, but without exposing the portable system 420 to the environment around the target device 450.

Similar to the holographic control system 320 illustrated in FIG. 3A, the portable system 420 may include a sealed housing 431 to prevent exposing the internal components to any external substances. Since the holographic generator 424 can project an image through the optical aperture 425, the integrity of the sealed housing 431 is maintained. In contrast, input methods to HMIs of the prior art typically require exposing one or more electromechanical components to the external environment.

To execute a control action, the operator 410 provides a user input 466 to the portable system 420 by passing a finger or hand through the holographic control of the holographic image 470 which corresponds to the desired control action. Alternatively, the user input 466 may be performed by other input methods known in the art. For example, it is contemplated that the operator 410 may interact with the control elements of the holographic image 470 by using a laser pointer or other pointing device.

The input detector 426 is configured to detect the location on the holographic image 470 that is being indicated by the operator 410. The input detector 426 may incorporate one or more of the techniques known in the art for detecting operator indications, such as optical detection, laser scanning, infrared ranging, or ultrasound ranging. The input detector 426 uses the location of the operator indication (e.g., the location of the operator's finger) to determine which particular holographic control in the holographic image 470 is being selected by the operator 410.

In this embodiment, the input detector 426 sends an input signal 471 to a wireless transceiver 428. The wireless transceiver 428 communicates with a device controller 440 by way of a wireless control signal 472. The device controller 440 is configured to perform the control action in the target device 450. The wireless control signal 472 may be generated according to technologies of the art, such as Bluetooth or WiFi, or other wireless technologies. It should be noted that, while FIG. 4A illustrates one wireless transceiver 428 communicating with one target device 450, it is also contemplated that a wireless transceiver 428 may communicate with a plurality of device controllers 440, each having a respective RFID tag by which it can be identified.

In one embodiment, the wireless transceiver 428 may be configured to transmit both a wireless control signal 472 and a wireless identification signal replacing the RFID connection 460. In other words, the wireless transceiver 428 may perform both the function of identifying and connecting to available devices, and transmitting control signals for controlling the target device. In such a case, the RFID reader 422 and the RFID tags 415 would not be required.

FIG. 4B illustrates an example of a portable holographic control system, according to one embodiment of the invention. In this example, a portable system 420 is being utilized in an industrial processing environment with stationary components 423, including a control valve 450, a pressure vessel 492, and a pump 490. In this embodiment, control valve 450 and pump 490 are each equipped with a device controller 440, thus enabling wireless control of the devices.

The portable system 420 may be configured to connect to a target device when a wireless transmitter 428 establishes a wireless connection with a target device equipped with a device controller 440 (e.g., control valve 450 and pump 490.) The initial identification and connection to available devices may be performed according to wireless standards such as RFID, Bluetooth, WiFi, or other similar technologies. If multiple devices are in range, the operator may be able to select from the available devices to establish a connection. Alternatively, the connection could be established by other means, for example by defaulting to the closest available device.

In this illustration, a holographic generator 424 is shown projecting a holographic image 470, which includes various holographic controls 480. An operator of the holographic control system 420 perceives the holographic image 470 as fixed in a space in between the operator and the holographic generator 424. An operator may initiate a control action by indicating a specific holographic control of the holographic controls 480. The operator performs an indication by putting his finger or hand in the space in which the desired holographic control appears to exist. The operator indication is detected by the input detector 426. The input detector 426 is configured to determine the holographic control selected by the operator based on the spatial coordinates of the operator indication. The control action selected by the operator is communicated to the target device (e.g., control valve 450), which carries out the control action.

Figure 5A:
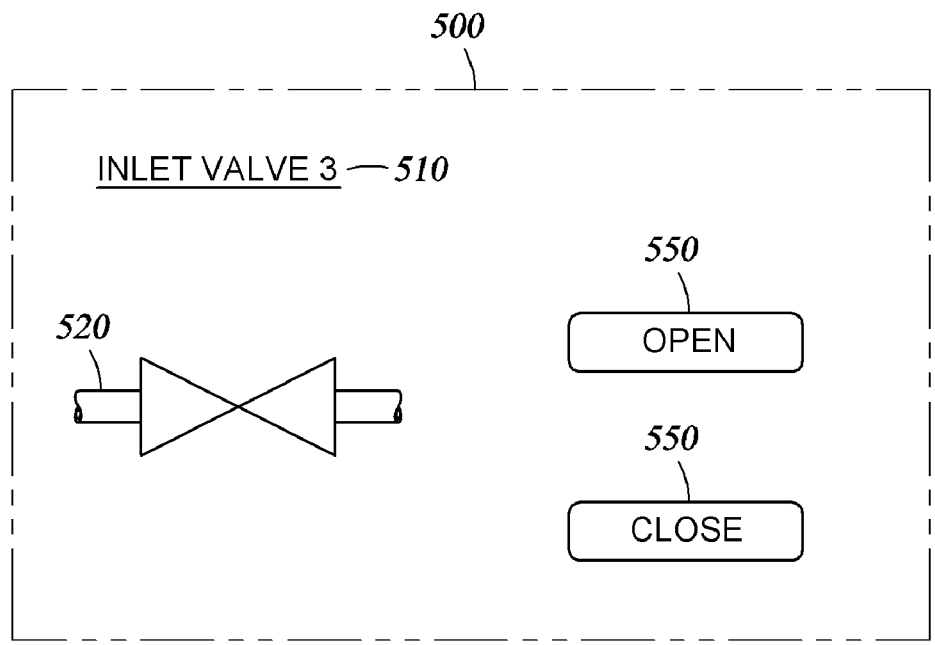
FIGS. 5A-B illustrate examples of holographic images included in a holographic control system configured for individual devices, according to one embodiment of the invention.
Figure 5B:
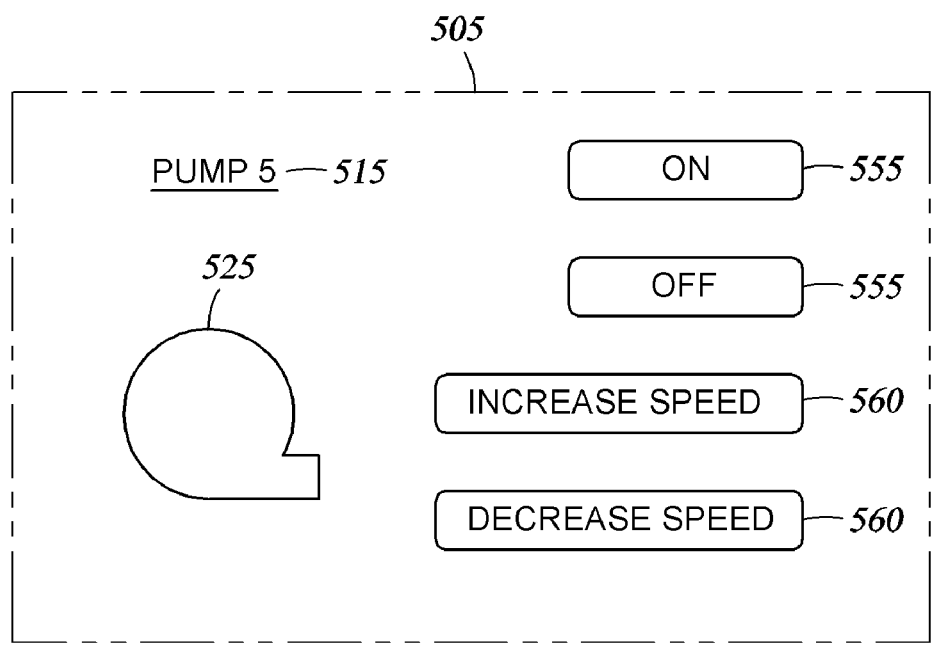

FIGS. 5A-B illustrate examples of holographic images included in a holographic control system configured for individual devices, according to one embodiment of the invention. In the example shown in FIG. 5A, a holographic image 500 includes a label 510 and an icon 520 to identify the processing device that is being controlled ("INLET VALVE 3".) The holographic image 500 also includes the user-selectable holographic controls 550, which in this example are controls to open or close the inlet valve. In another example shown in FIG. 5B, a holographic image 505 includes a label 515 and an icon 525 to identify another processing device that is being controlled ("PUMP 5".) The holographic image 505 also includes the user-selectable holographic controls 555 to turn the pump on or off, and the user-selectable holographic controls 560 to increase or decrease the pump speed. In each case, the user-selectable controls are capable of being interacted with (via an appropriate input detector, such as those show in FIGS. 2 and 4) by a user in order to manipulate the respective device.

Figure 6:
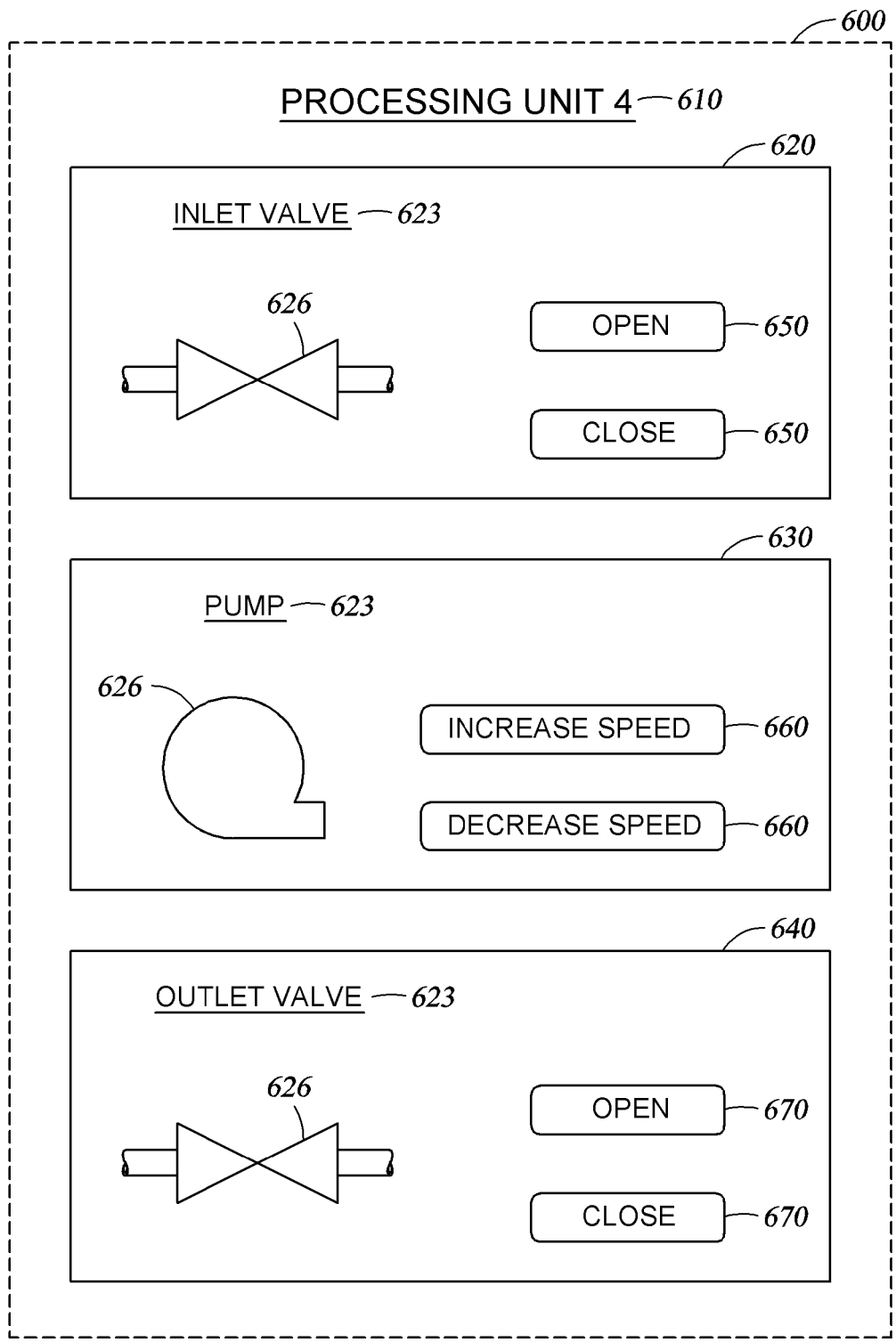
FIG. 6 illustrates an example of a holographic image included in a holographic control system configured for multiple devices, according to one embodiment of the invention.

FIG. 6 illustrates an example of a holographic image included in a holographic control system configured for multiple devices, according to one embodiment of the invention. As shown, a holographic image 600 includes a label 610 to identify the grouping of devices that the holographic control system is connected to ("PROCESSING UNIT 4".) Also included in the holographic image 600 is a section for each device that is part of "PROCESSING UNIT 4", namely an inlet valve section 620, a pump section 630, and an outlet valve section 640. Each section includes a device label 623 and an icon 626 to identify the specific device corresponding to that section. The inlet valve section 620 includes the user-selectable holographic controls 650 to open or close the inlet valve. The pump section 630 includes the user-selectable holographic controls 660 to increase or decrease the speed of the pump. The outlet valve section 640 includes the holographic controls 670 to open or close the outlet valve. In each case, the user-selectable controls of FIGS. 5 and 6 are capable of being interacted with (via an appropriate input detector, such as those shown in FIGS. 2 and 4) by a user in order to manipulate the respective device.

In an alternative embodiment of the invention, a holographic control system configured for multiple devices could first present a user with a menu of available devices. The operator could then select a single device to control. In response, the holographic control system could present a set of holographic controls for the selected device alone, similar to the examples illustrated in FIGS. 5A-B.

CONCLUSION

The use of holographic controls may provide safety advantages in processing environments. For example, since the operator interacts with holographic images, and does not directly interact with electromechanical switches, the possibility of an explosion triggered by an electric spark is lessened. Also, since sealed housings do not have to be opened to access controls as in the prior art, there is less likelihood of exposing the electrical controls to explosive substances.

Holographic controls may also improve reliability. For example, since the controls are not directly exposed to contaminated or corrosive environments, the failure of controls is make less likely. Also, since there is no mechanical actuation of electromechanical controls, there is less probability of failure due to mechanical wear.

In a portable form, embodiments of the invention may result in cost savings, since a single portable device may provide the functionality of multiple HMIs statically mounted in proximity to processing equipment. A portable device may also provide an HMI in areas where space or form factor preclude the permanent mounting of controls.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A system, comprising:
  a holographic generator configured to display a respective holographic control interface for each of a plurality of devices of a processing facility;
  device selection circuitry for selecting which of the plurality of devices is to be operated; wherein the device selection circuitry is configured to:
    receive a selection of a device, of the plurality of devices, to be operated; and
    responsive to receiving the selection of the device, cause the holographic generator to display the respective holographic control interface for the selected device, whereby the holographic generator is operated to display different holographic control interfaces at different times depending on which of the plurality of devices is selected for operation;
  an input detector configured to receive user input indicative of user interaction with the displayed holographic control interface; and
  control circuitry configured to issue a control signal responsive to the user input, wherein the control signal operates the selected device of the processing facility.

2. The system of claim 1, wherein the one or more devices controlled by interaction with the respective holographic control interface are selected from at least one of a valve, a pump, a compressor, a heater, and a fan.

3. The system of claim 1, further comprising a proximity sensor to activate the holographic generator when a radio-activated tag is detected within a predetermined operating range of the proximity sensor.

4. The system of claim 3, wherein the radio-activated tag is a radio frequency identification (RF ID) tag.

5. The system of claim 1, further comprising a housing enclosing the holographic generator to seal the holographic generator from ambient environment.

6. The system of claim 1, further comprising a light source configured to illuminate the selected device responsive to receiving the selection of the device.

7. The system of claim 1, wherein the holographic generator is secured as a fixture in a given location of the processing facility.

8. The system of claim 1, wherein said holographic generator is further configured to display a status of one or more devices of the processing facility.

9. A system, comprising:
  a plurality of devices in a processing facility;
  a respective device controller configured to control a respective one of the plurality of devices;
  one or more stationary wireless communication modules in communication with each of the device controllers; and
  a portable control device, comprising:
    a holographic generator configured to display a respective holographic control interface for each of the plurality of device;
    device selection circuitry for detecting which of the plurality of devices is to be operated; wherein the device selection circuitry is configured to:
      receive a selection of a device, of the plurality of devices, to be operated; and
      responsive to receiving the selection of the device, cause the holographic generator to display the respective holographic control interface for the selected device, whereby the holographic generator is operated to display different holographic control interfaces at different times depending on which of the plurality of devices is selected for operation;
    an input detector configured to receive user input indicative of user interaction with the displayed holographic control interface; and
    a wireless communication module configured to issue control signals to the stationary wireless communication module responsive to the user input, wherein the control signals cause the respective device controller to operate the respective selected device.

10. The system of claim 9, wherein the plurality of devices controlled by interaction with the respective holographic control interface are selected from at least one of a valve, a pump, a compressor, a heater, and a fan.

11. The system of claim 9, further comprising a proximity sensor to activate the holographic generator when a radio-activated tag is detected within a predetermined operating range of the proximity sensor.

12. The system of claim 11, wherein the radio activated tag is a radio frequency identification (RFID) tag.

13. The system of claim 9, further comprising a housing enclosing the holographic generator to seal the holographic generator from ambient environment.

14. The system of claim 9, wherein said holographic generator is further configured to display a status of the device.

15. A method for providing a holographic control interface, comprising:
selectively generating a respective holographic control interface for each of a plurality of devices of a processing facility, wherein each respective holographic control interface includes one or more holographic controls for the respective device;
receiving a selection of a device, of the plurality of devices, to be operated; and
responsive to receiving the selection of the device, causing the holographic generator to display the respective holographic control interface for the selected device, whereby the holographic generator is operated to display different holographic control interfaces at different times depending on which of the plurality of devices is selected for operation;
detecting an operator interaction with the one or more holographic controls of the displayed holographic control interface for the selected device; and
issuing one or more control signals responsive to the detected operator interaction, the one or more control signals configured to operate the selected device.

16. The method of claim 15, wherein the selected device is selected from a control valve, a pump, a compressor, a heater, and a fan.

17. The method of claim 15, wherein said operator interaction is made by the placement of a finger relative to the one or more holographic controls.

18. The method of claim 15, wherein said holographic control interface includes one or more displays of a status of the selected device controlled by the one or more control signals.

19. The method of claim 15, further comprising illuminating the selected device during a period when the operator interaction with the one or more holographic controls is detected.

20. The method of claim 15, wherein said plurality of holographic control interfaces is stored in a database.

21. The method of claim 20, wherein said database is a remote database accessed by a wireless communication link.

22. A system, comprising:
a holographic generator configured to display a respective holographic control interface for each of a plurality of devices of a processing facility;
device selection circuitry for selecting which of the plurality of devices is to be operated; wherein the device detection circuitry is configured to:
receive a device identification signal identifying a selected one of the plurality of devices; wherein the device identification signal is received from a wireless transmitter associated with the selected one of the plurality of devices; and
responsive to receiving the device identification signal, cause the holographic generator to display the respective holographic control interface for the selected device, whereby the holographic generator is operated to display different holographic control interfaces at different times depending on which of the plurality of devices is selected for operation;
an input detector configured to receive user input indicative of user interaction with the displayed holographic control interface;
control circuitry configured to issue a control signal responsive to the user input, wherein the control signal operates the selected device of the processing facility;
a proximity sensor to activate the holographic generator when a radio-activated tag is detected within a predetermined operating range of the proximity sensor; and
a housing enclosing the holographic generator to seal the holographic generator from ambient environment.

23. The system of claim 20, wherein the one or more devices controlled by interaction with the holographic controls are selected from at least one of a valve, a pump, a compressor, a heater, and a fan.

24. The system of claim 20, wherein the radio-activated tag is a radio frequency identification (RFID) tag.

25. The system of claim 20, further comprising a light source configured to illuminate a target device of the one or more devices, the target device being selected according to the user input.

26. The system of claim 20, wherein said holographic generator is further configured to display a status of one or more devices of the processing facility.

* * * * *

UNITED STATES PATENT AND TRADEMARK OFFICE
CERTIFICATE OF CORRECTION

PATENT NO.         : 7,724,407 B2                                                     Page 1 of 1
APPLICATION NO.    : 11/614903
DATED              : May 25, 2010
INVENTOR(S)        : O. Cadet et al.

It is certified that error appears in the above-identified patent and that said Letters Patent is hereby corrected as shown below:

In Column 12, line 38, replace the word "device" with the word --devices--.

In Column 14, line 33, replace the words "claim 20" with the words --claim 22--.

In Column 14, line 37, replace the words "claim 20" with the words --claim 22--.

In Column 14, line 39, replace the words "claim 20" with the words --claim 22--.

In Column 14, line 43, replace the words "claim 20" with the words --claim 22--.

Signed and Sealed this

Twelfth Day of October, 2010

David J. Kappos
*Director of the United States Patent and Trademark Office*